United States Patent [19]

LaCount

[11] Patent Number: 4,708,382

[45] Date of Patent: Nov. 24, 1987

[54] SEPARABLE LIFTING HOOK

[75] Inventor: Kenneth H. LaCount, Lexington, S.C.

[73] Assignee: Cooper Industries, Houston, Tex.

[21] Appl. No.: 4,933

[22] Filed: Jan. 20, 1987

[51] Int. Cl.[4] .............................................. B66C 1/34
[52] U.S. Cl. .................................... 294/82.1; 59/95; 403/78
[58] Field of Search ................ 294/82.1, 82.11, 82.15, 294/82.16; 24/230.5 R, 265 H; 59/93, 95; 403/78, 164, 165

[56] References Cited

U.S. PATENT DOCUMENTS

| | | | |
|---|---|---|---|
| 1,150,892 | 8/1915 | Sherwood | 59/95 |
| 2,231,416 | 2/1941 | Stahl | 294/82.11 |
| 2,625,005 | 1/1953 | Myers | 294/82.1 X |

FOREIGN PATENT DOCUMENTS

| | | | |
|---|---|---|---|
| 134862 | 3/1985 | European Pat. Off. | 294/82.11 |
| 725114 | 9/1942 | Fed. Rep. of Germany | 294/82.1 |
| 858730 | 12/1940 | France | 294/82.1 |
| 1185962 | 8/1959 | France | 294/82.1 |

Primary Examiner—Johnny D. Cherry
Attorney, Agent, or Firm—E. E. Scott; A. R. Thiele

[57] ABSTRACT

A lifting hook assembly has a hook member with a tapered shank portion. Surrounding the tapered shank portion is a plurality of wedge members which are retained orthogonally in position by a toroidal member and axially in position by a cap. A housing surrounds the toroidal member and provides for attachment of the lifting hook assembly to a chain, rope or the like.

9 Claims, 4 Drawing Figures

SEPARABLE LIFTING HOOK

BACKGROUND OF THE INVENTION

This invention pertains to a hook design, more particularly this invention pertains to a design for a lifting hook which may be disassembled and inspected for wear.

Lifting hooks for use with chains or ropes have been in use for many years. Many of the lifting hooks found in the prior art have welded or sealed housings and thus cannot be easily opened for inspection. Those hook assemblies which can be disassembled are characterized by having portions upon which there are high stress concentrations. Such high concentrations cause abnormal wear patterns and enhance the possibility of premature failure of the hook assembly.

There is therefore a need in the art to provide a separable hook design which may be readily opened for inspection and which is also characterized by a design which minimizes if not eliminates points of high stress concentration. The desired hook design should also be rotatable and usable with chains, rope, slings or the like and readily assembled and reassembled by low skilled personnel.

SUMMARY OF THE INVENTION

A lifting hook assembly has a hook member which is distinguished by a tapered shank portion formed on the upper shank of the hook member. The tapered shank portion is formed so that it may rest within a plurality of wedge members. A toroidal member having a tapered inner surface surrounds the wedge members. The interfitment of the toroidal member against the wedge members retains the wedge members orthogonally with respect to the tapered shank portion of the hook member. Retaining the wedge members axially with respect to the tapered portion of the hook member is a cap which fits over the top of the wedge members and the toroidal member. A snap ring fits over the cap and engages a groove formed in the upper portion of the shank portion of the hook member. Surrounding and supporting the toroidal member is a housing. Ball bearings are placed between the inside of the housing and a race formed in the bottom of the toroidial member. A chain engagement lock is added to the top of the housing for attachment of the lifting hook assembly to a chain, a rope or the like.

BRIEF DESCRIPTION OF THE DRAWINGS

A better understanding of the lifting hook assembly in the present invention may be had by reference to the drawings wherein.

BRIEF DESCRIPTION OF THE EMBODIMENTS

Figure 1:
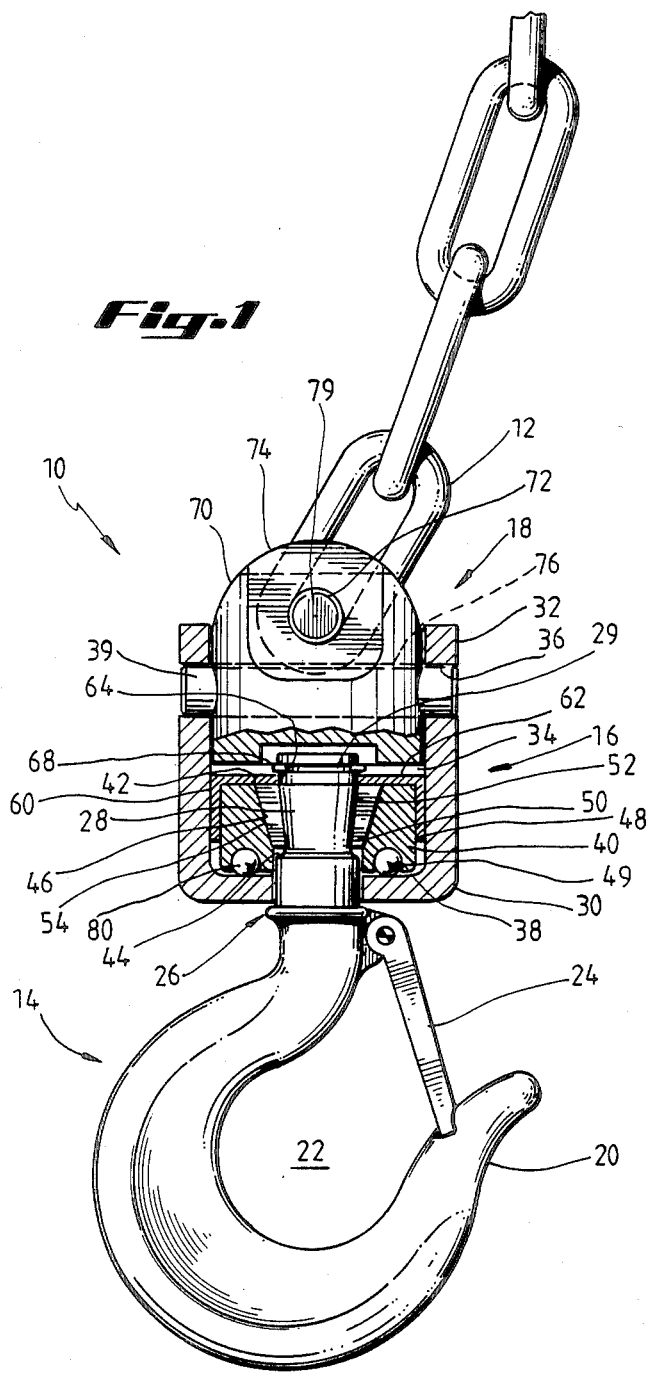
FIG. 1 is a front elevational view in partial section of the lifting hook assembly of the present invention.
Figure 2:
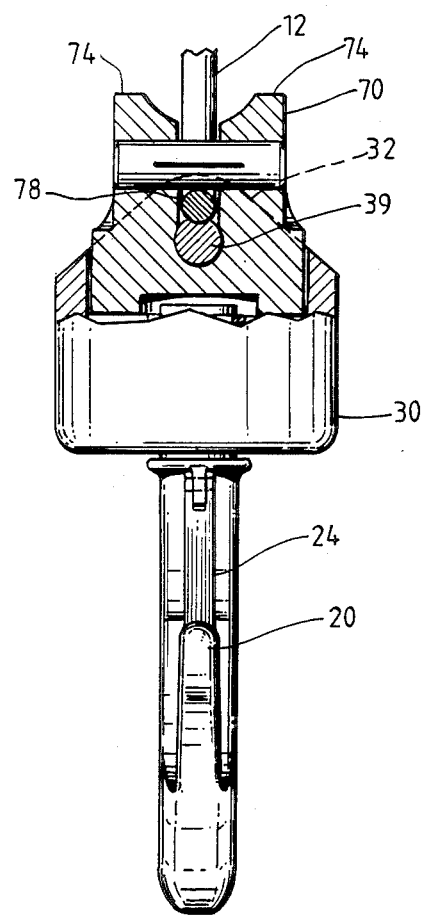
FIG. 2 is a side elevational view in partial section of the lifting hook assembly shown in FIG. 1.
Figure 3:
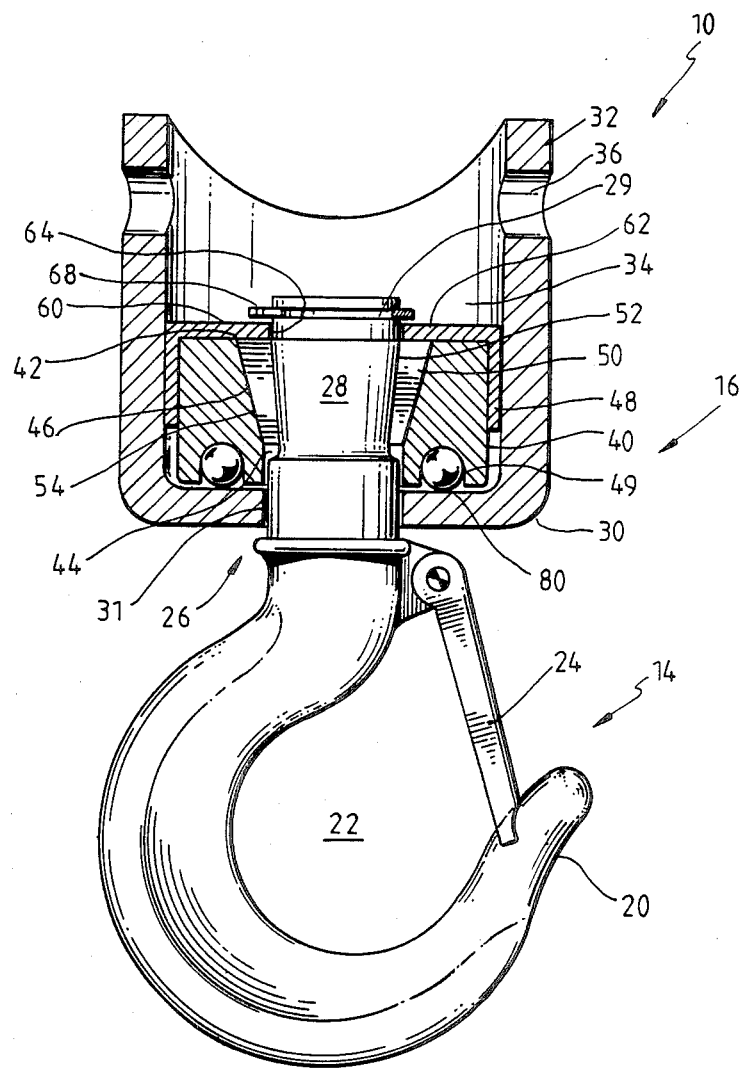
FIG. 3 is a front elevational view in partial section of the lifting hook shown in FIG. 1.
Figure 4:
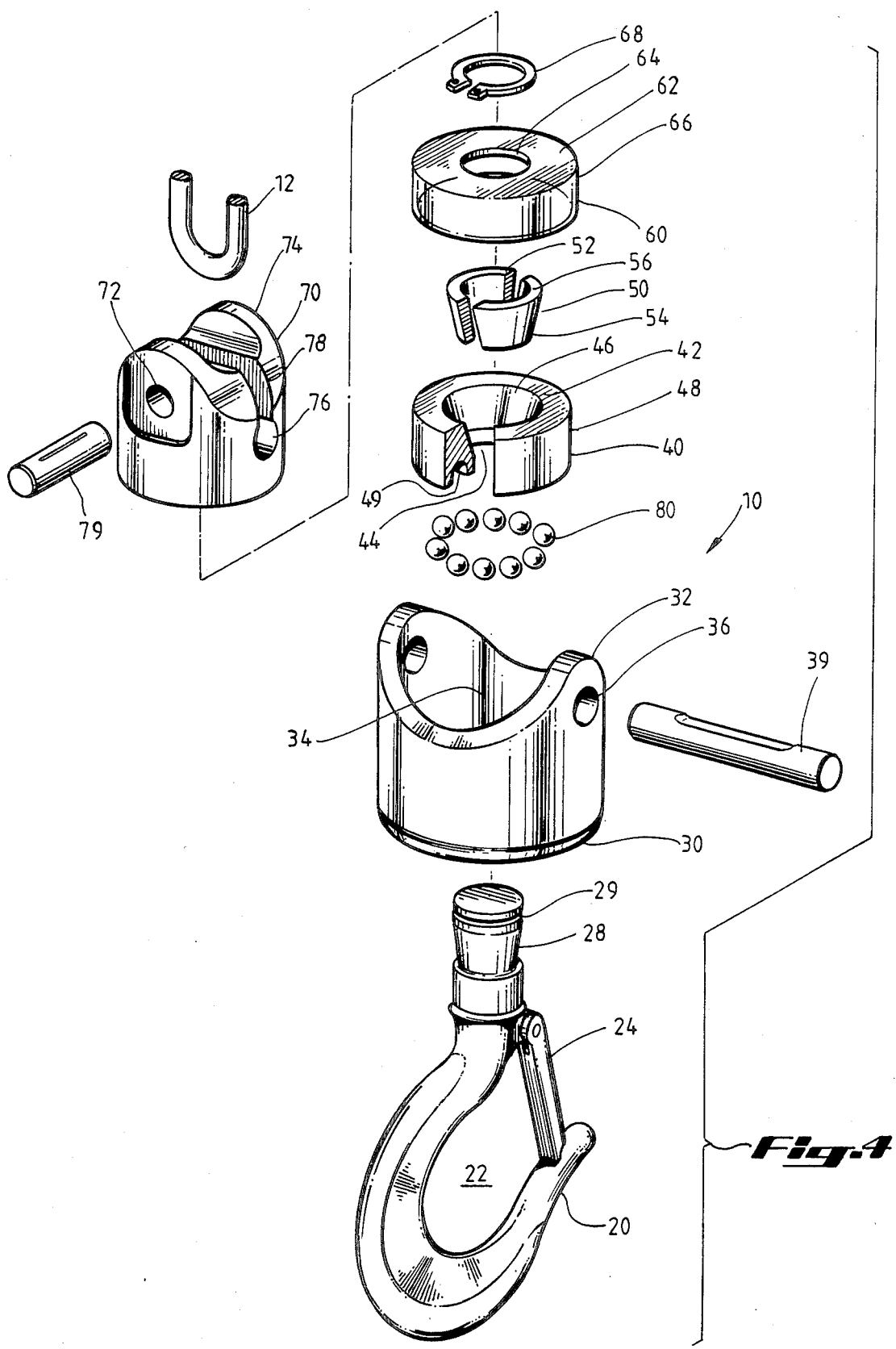
FIG. 4 is an exploded view thereof.

The lifting hook assembly 10 shown in FIGS. 1 through 4 includes a hook portion, generally 14, a retaining portion 16, and a chain engagement portion 18. As may be best seen by reference to FIGS. 1 and 3, hook portion 14 includes a U-shaped hook 20. Within hook 20 is a throat 22 and a hinged retainer 24 covering throat 22. The upper or shank portion 26 of hook portion 14 is distinctive in that it is characterized by having a machined taper 28 emanating from hook 20. Above machined taper 28 is groove 29 whose use will be explained below. It is hook portion 14, which is supported by retaining portion 16. Retaining portion 16 in turn mounts chain engagement portion 18.

Retaining and supporting the hook portion 14 is retaining portion 16 which engages tapered surface 28 of hook portion 14. Retaining portion 16 includes of a plurality of wedge members 50. While two wedge members are shown in the preferred embodiment illustrated in FIG. 4, it will be understood that a plurality of wedge members 50 may be used without departing from the scope of the invention.

Wedge members 50 are characterized by having an inner taper 52 and an outer taper 54. Inner taper 52 is machined to be compatible with tapered surface 28 on shank 26 of hook portion 14.

Retaining wedge members 50 in position with respect to tapered surface 28 is a toroidal member 40. Toroidal member 40 is characterized by having a top opening 42, a bottom opening 44 and a tapered surface 46 therebetween. Tapered surface 46 is machined so as to be compatible with outer taper 54 of wedge members 50. Formed in the bottom of toroidal member 40 is race 49. The utility of race 49 will be described below.

Retaining wedge members 50 axially in position with respect to tapered surface 28 is cap 60. Cap 60 is characterized by having a hole 64 in its center and a top 62 large enough to cover the top of toroidal member 40. Cap 60 is retained in position by snap ring 68 which engages groove 29 at the top of shank portion 26 of hook portion 14. Toroidal member 40, wedge members 50 and cap 60 make up the retention portion of the lifting hook assembly 10.

Mounted to retention portion 16 of lifting hook assembly 10 is a chain engaging portion 18. The engagement between the chain engaging portion 18 and the retention portion 16 is accomplished by contact of the bottom surface 38 of housing 30 with ball bearings 80. Ball bearings 80 fit within race 49 machined in the bottom of toroidal member 40. Sufficient clearance exists between the side 48 of toroidal member 40 and housing 30 to allow for rotation of toroidal member 40 on ball bearings 80. Housing 30 is further characterized by having two upstanding ears 32 in which are formed holes 36. Fitting within holes 36 is pin 39 which is compatible with hole 76 formed at the bottom of space 78 in chain engagement block 70. The interior portion 34 of housing 30 is sufficient in size to contain the retention portion 16 and the chain engagement portion 18.

Chain engagement block 70 is further characterized by two upstanding ears 74 through which is bored hole 72. A pin 79 is insertable through hole 72 to engage a link of chain 12.

OPERATION

When it is desired to use the lifting hook assembly of the present invention, shank 26 of hook portion 14 is inserted through hole 31 formed in the bottom of housing 30. Ball bearings 80 are then inserted into central opening 34 of housing 30. Toroidal member 40 is then placed over ball bearings 80 such that race 49 engages ball bearings 80. Once toroidal member 40 is in position wedge members 50 may then be inserted past top opening 42 of toroidal member 40. Wedge members 50 are held in position by placing cap 60 over top 56 of wedge member 50. Snap ring 68 is then put in place by engagement with groove 29. Block 70 may then be inserted in central opening 34 of housing 30. Retaining chain engagement block 70 in position is pin 39 which passes through holes 36 in ears 32 then through hole 76 in block 70 which is located at the bottom of space 78. Chain 12 is then engaged with block 70 by insertion of pin 79 through hole 72 formed in ears 74 at the top of block 70.

All components of the lifting hook assembly of the present invention may be formed from ferrous materials. If desired, additional nonferrous materials may be added such as low friction coatings on the tapered surfaces or on the ball bearing race.

There is thereby provided by the rotatable separable hook assembly of the present invention a device which has minimal stress concentration and can be readily disassembled for inspection without destroying the mechanical abilities of the hook.

The separable hook assembly of the present invention, while described with reference to the preferred embodiment, is to be defined only by the claims as understood by a person of ordinary skill in the art to which this invention pertains.

I claim:

1. A lifting hook assembly comprising:
    a hook member having a tapered shank portion disposed above the throat of said hook member;
    a plurality of tapered wedge members constructed and arranged to substantially surround said tapered shank portion of said hook member;
    a substantially toroidal member constructed and arranged to surround said tapered wedge members, said substantially toroidal member having a tapered inner surface;
    a cap constructed and arranged to fit over said substantially toroidal member for retaining said tapered wedge members axially in position with respect to said tapered shank portion of said hook member;
    a housing surrounding said substantially toroidal member, said housing including means for attachment of chain, rope or the like;
    whereby said hook member is supported in substantially toroidal member by the interfitment of said tapered wedge members between said substantially toroidal member and said tapered portion of said hook member.

2. The lifting hook assembly as defined in claim 1 further including means for retaining said cap in position.

3. The lifting hook assembly as defined in claim 2 wherein said means for retaining said cap in position is a snap ring engagable with a groove formed in the shank portion of said hook member.

4. A lifting hook assembly comprising:
    a hook member having a tapered shank portion disposed above the throat of said hook member;
    a plurality of tapered wedge members constructed and arranged to substantially surround said tapered shank portion of said hook member;
    a substantially toroidal member constructed and arranged to surround said tapered wedge members, said substantially toroidal member having a tapered inner surface;
    a cap constructed and arranged to fit over said substantially toroidal member for retaining said tapered wedge members axially in position with respect to said tapered shank portion of said hook member;
    a housing surrounding said substantially toroidal member, said housing including means for attachment of chain, rope or the like; and
    means for rotatably supporting said substantially toroidal member within said housing;
    whereby said hook member is supported in substantially toroidal member by the interfitment of said tapered wedge members between said substantially toroidal member with said tapered portion of said hook member.

5. The lifting hook assembly as defined in claim 4 further including means for retaining said cap in position.

6. The lifting hook assembly as defined in claim 5 wherein said means for retaining said cap in position is a snap ring engagable with a groove formed in the shank portion of said hook member.

7. The lifting hook assembly as defined in claim 4 wherein said means for rotatably supporting said substantially toroidal member within said housing are ball bearings.

8. A method for rotatably and separably attaching a hook member to a chain engaging housing comprising the steps of:
    forming a tapered portion on the shank of the hook member;
    inserting the tapered portion of said shank through a hole in the bottom of the chain engaging housing;
    placing a plurality of tapered wedge members around the tapered portion of said shank of said hook member;
    retaining said tapered wedge members in position substantially orthogonally with respect to said tapered portion of said shank of said hook member by surrounding said tapered wedge members with a substantially toroidal member;
    retaining said tapered wedge members in position substantially axially with respect to said tapered portion with a cap of said shank of said hook member; and
    affixing a chain to the chain engaging housing.

9. The method as defined in claim 8 further including the step of rotatably supporting said substantial toroidal member within the chain engaging housing.

* * * * *